United States Patent [19]

Müller et al.

[11] Patent Number: 5,125,776

[45] Date of Patent: Jun. 30, 1992

[54] HYDRAULIC CLAMPING DEVICE

[75] Inventors: Peter Müller, Altusried; Ulrich Bauer, Steinheim; Monika Schrem, Giengen, all of Fed. Rep. of Germany

[73] Assignee: Albert Schrem Werkzeugfabrik GmbH, Giengen, Fed. Rep. of Germany

[21] Appl. No.: 631,007

[22] Filed: Dec. 18, 1990

[30] Foreign Application Priority Data

Dec. 18, 1989 [DE] Fed. Rep. of Germany ....... 3941765

[51] Int. Cl.⁵ .............................................. B23F 23/12
[52] U.S. Cl. ................................. 409/234; 279/4.01; 403/15; 403/31
[58] Field of Search ............... 279/2 A, 4, 1 R, 1 ME, 279/1 G; 409/232, 234, 33, 60; 24/463; 403/15, 31

[56] References Cited

U.S. PATENT DOCUMENTS

| | | | |
|---|---|---|---|
| 3,033,597 | 5/1962 | Miller | 403/15 |
| 3,242,818 | 3/1966 | Kastler | 409/234 |
| 4,697,966 | 10/1987 | Baur | 279/4 X |
| 4,953,877 | 9/1990 | Slachta et al. | 279/2 A |

Primary Examiner—Steven C. Bishop
Attorney, Agent, or Firm—Robert W. Becker & Associates

[57] ABSTRACT

A hydraulic clamping device for the axial clamping of bodies of rotation, especially tools, onto a revolving mandrel is provided. It has a base body fixed to a mandrel and a rotary piston which is suspended in a floating manner inside the base body and is axially slidable relative to the base body via a closed-circuit hydraulic system and setscrews. The tool is tightly clamped in an axial direction. In order to improve the axial rigidity of the hydraulic clamping device, to provide a fast and directed adjustment of the concentricity during the clamping of the tool inside the device and to provide a radial freedom of play during operation, a sleeve fastened to the mandrel is provided to which the base body is attached. The sleeve is equipped with an elastic flange, a first face of which is engaged by the rotary piston and a second face of which is abuttable against said tool.

17 Claims, 3 Drawing Sheets

HYDRAULIC CLAMPING DEVICE

BACKGROUND OF THE INVENTION

The present invention relates to a hydraulic clamping device for the axial clamping of bodies of rotation, for example, disk-shaped or roller-shaped workpieces or tools, especially hobs, onto a revolving mandrel, having a base body fixed to the mandrel and a rotary piston which is suspended in a floating manner inside the base body and is axially slidable relative to the base body via a closed-circuit hydraulic system and pressure elements such as setscrews and which tightly clamps the workpiece or tool in an axial direction.

Hydraulic clamping devices of the aforementioned kind represent an improvement of mechanical clamping devices since they are able to provide clamping forces increased by several magnitudes. Such great axial clamping forces are necessary, for example, in order to maintain the position and the concentricity of a revolving tool during the machining process of a workpieces under high cutting loads.

Generally, the hydraulic clamping device is screwed onto the free end of a mandrel that is carrying the tool, for example, a cutter, until it abuts at the cutter. By screwing in at least one radially or axially arranged setscrew, a rotary, piston which is suspended in a floating manner inside the base body is pushed outward in an axial direction. Despite the lesser mechanical force required in comparison with a mechanical clamping device, the hydraulic force transmission achieves a substantially higher axial clamping force.

Since the rotary piston is suspended in a floating manner, an uneven sliding of the rotary piston in the outward direction may result from an uneven internal pressure distribution and/or uneven friction conditions. This may cause a radial displacement of the tool or an axial deviation, a so-called bending, of the free end of the mandrel. In some cases, the rotary piston floating on the hydraulic fluid "cushion" may not withstand the high cutting force loads so that concentricity deviations of the tool may occur also. When the use of auxiliary means such as a hammer is not desired, a manual adjustment of the tools, with known clamping devices, into a so-called center cradle, i.e., between two tips, is only possible by clamping the tool repeatedly until the ideal position is essentially reached. However, this method of trial and error is not very satisfactory, since the reduction of time between productive operation intervals of the machines is an important factor in manufacturing.

It is therefore an object of the present invention to improve the axial rigidity of the clamping device, to provide a directed, easy and fast adjustment of concentricity errors during the clamping of the tool and also to alleviate radial play during operation.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
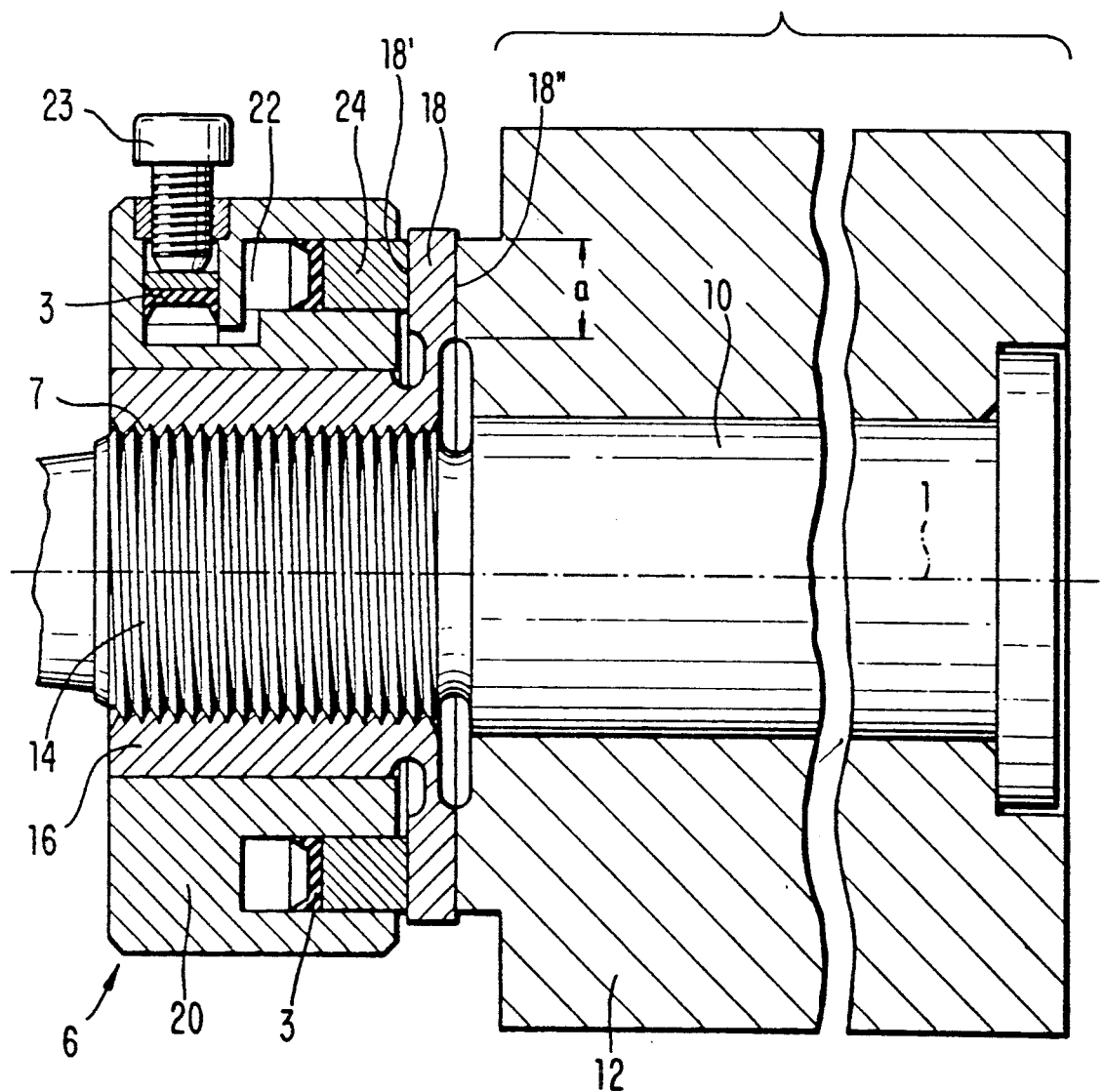
FIG. 1 is a cross-sectional view of a first inventive embodiment.

The hydraulic clamping device of the present invention is primarily characterized by an elastic element disposed between a base body of the hydraulic clamping nut and the body of rotation, whereby the elastic element is engagable by a rotary piston and abuttable against the body of rotation.

The gist of the invention is to provide an intermediate element in the form of a sleeve or similar means having an elastic radial element preferably in the form of an elastic radial flange. The sleeve, with its elastic radial flange is fastened onto the free mandrel end, for example, by screwing. A hydraulic clamping device is then screwed or slipped onto the sleeve. During the clamping action the rotary piston no longer presses against the body of rotation or tool, but instead the elastic radial flange positions and fastens the tool. With this arrangement, displacements are only possible when the cutting forces are greater than the frictional forces acting on the face of the radial flange. An axial deviation or bending of the free mandrel end is also prevented since the rotary piston no longer exerts forces onto the body of rotation or tool but onto the interposed elastic radial flange. An uneven sliding of the rotary piston is thus compensated for by the inventive design of the elastic radial flange.

In a further advantageous embodiment of the present invention, a further mechanical nut is screwed onto the base body of the clamping nut which may abut against the elastic radial flange so that the radial clamping is maintained when the hydraulic rotary piston is relieved.

In another embodiment of the present invention a pressure ring which has a relatively large radial play is provided between the additional mechanical nut that is in the form of a screw collar ring and the elastic radial flange. The cross-section of the pressure ring is of a conical or wedge-shaped profile so that when the pressure ring is adjusted radially, the flange is loaded on one face. The adjustment of the pressure ring may be achieved by radially arranged setscrews disposed in the screw collar ring. By a respective radial adjustment of the pressure ring, a bent mandrel may be realigned and concentricity errors may be minimized. Concentricity adjustments may be carried out in a directed manner so that the system comprising the mandrel, the body of rotation or tool and the clamping device may be aligned in an easy and fast fashion.

Another advantage of the present invention is that the elastic radial flange pushes the rotary piston back into its initial position so that the clamping device becomes unlocked. In the clamping devices of the prior art, the step of pushing the rotary piston back into the initial position has to be carried out in an additional separate step, for example, by an additional clamping step using clamping jaws.

DESCRIPTION OF PREFERRED EMBODIMENTS

The present invention will now be described in detail with the aid of several specific embodiments utilizing FIGS. 1 through 3.

According to the first embodiment represented in FIG. 1, a body of rotation or tool, for example, a hob 12, is slipped onto the free end of the mandrel 10. At the other end of the mandrel 10, the hob 12 rests against a radial shoulder or a similar means and thereby is fixed in its position.

The free end of the mandrel 10 in the area 14 is provided with a thread 7, onto which a sleeve 16 having an elastic radial flange 18 is screwed. Onto the sleeve 16 the base body 20 of a hydraulic clamping nut 6 is screwed. The base body 20 is equipped with hydraulic channels 22 which are sealed to the outside by respective sealings 3. This internal hydraulic system is acted upon by a plurality of radially arranged setscrews 23. The screws 23 are generally in the form of socket head cap screws. The hydraulic fluid presses the rotary piston 24 against the abutment surface 18' of the flange 18. The flange 18 with its radial contact surface 18", opposite the abutment surface 18', then tightly clamps the hob 12.

With this embodiment, radially directed displacement forces, that especially occur during the cutting process as a result of the cutting forces, may not act on the rotary piston 24 anymore so that an axial displacement of the rotary piston 24, suspended in a floating manner, is prevented. Usually, the rotary piston may not withstand such radial forces, due to its suspension in a floating manner. In the presented embodiment, these forces are compensated by the elastic radial flange 18. In The radial contact surface 18' engaging to the tool or hob 12, may be provided with a coating of a material which increases the friction coefficient so that the radial fixation of the hob 12 is improved.

An uneven axial sliding of the rotary piston 24 during the clamping thus does not lead to a radial displacement of the hob 12, since the intermediate elastic radial flange 18 compensates this uneven movement.

Figure 2:
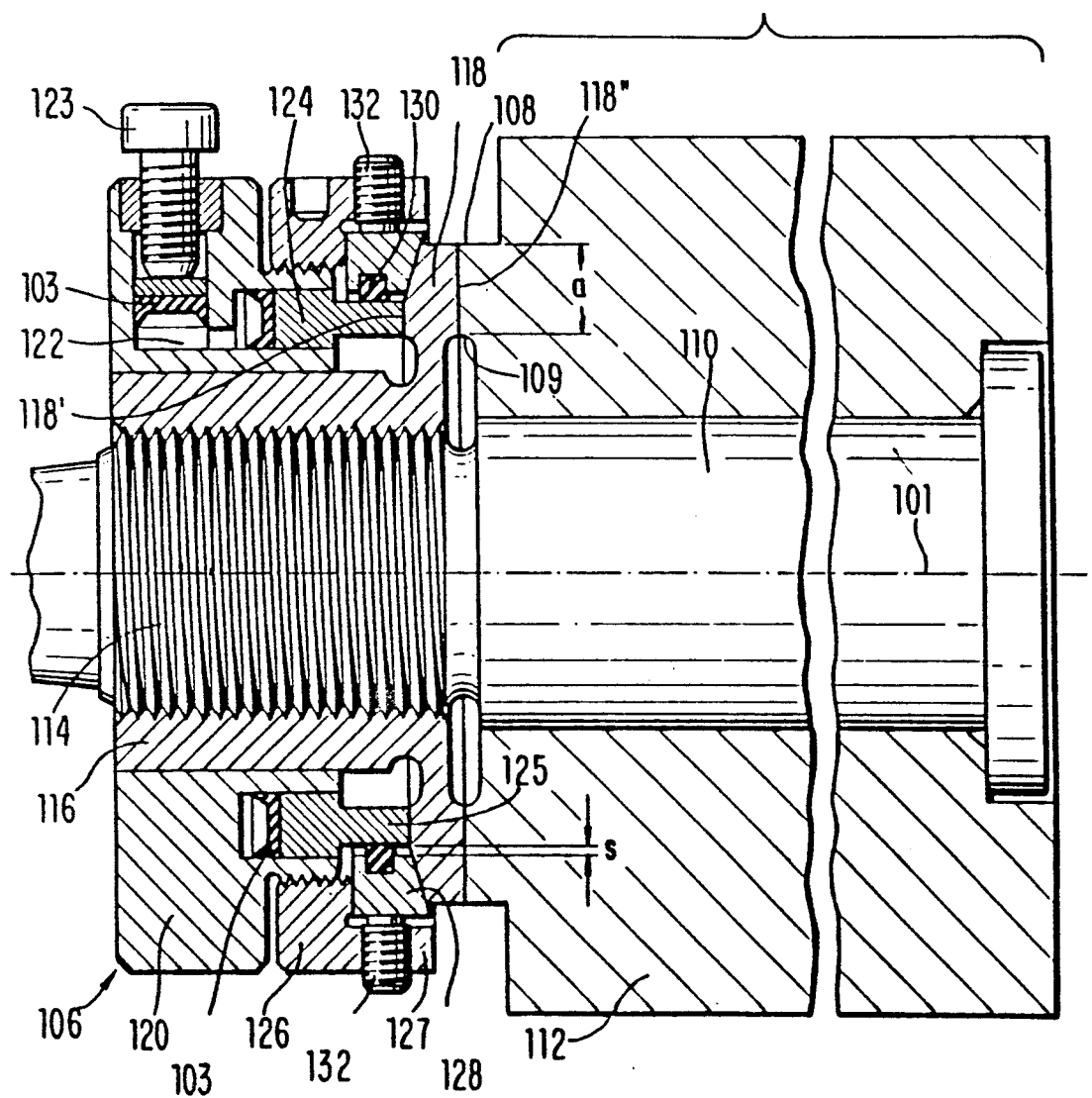
FIG. 2 shows a cross-sectional view of a second inventive embodiment.

In a further improved embodiment of the present invention, which is schematically represented in FIG. 2, a sleeve 116 provided with an elastic radial flange 118 is screwed onto the free end of the mandrel 114. The sleeve 116 carries the base body 120 of a hydraulic clamping nut 106, which presses the rotary piston 124 against the elastic radial flange 118 with the aid of the screws 123 acting on the hydraulic system that comprises the hydraulic channels 122 and the sealings 103.

At a portion of the base body 120 that is reduced in its outer diameter, a threaded ring 126 in the form of a screw collar ring is provided which is movable by screws in the direction of the elastic radial flange 118. Between the threaded ring 126 and the elastic radial flange 118, a conical pressure ring 128 is provided, which has a wedge-shaped cross-section and is resting with a relatively large radial play s on the rotary piston 124, respectively its axial extension 125. Between the rotary piston 124 and the conical pressure ring 128, an elastic ring 130, preferably a rubber ring, is disposed, which, in a non-clamped state, serves to center the conical pressure ring 128, but displays only little resistance against a radial adjustment of the conical pressure ring 128. The projection 127 of the threaded ring 126 is equipped with radial setscrews 132 which act on the conical pressure ring 128 to permit its directed radial displacement. For example, screwing the upper screws (in FIG. 2) inward and unscrewing the bottom screws 132 (in FIG. 2) results in moving the conical pressure ring 128 in an downward direction. Due to the wedge-like function of the conical pressure ring 128, the elastic radial flange 118, in the upper section of FIG. 2, is axially moved to the right, while the lower section of the elastic radial flange 118 in FIG. 2 is relieved. Such a directed influence of the axial clamping forces, results in an optimized adjustment of the concentricity of the system comprising the mandrel 114, the clamping nut 116 and the tool 112.

After the adjustment is completed, the rotary piston 124 may be relieved, while the elastic radial flange 118 is held in its fixed position by the conical pressure ring 128 and the threaded ring 126. High cutting force loads do not lead to deviations of the concentricity of the tool 112. The rigidity of the system corresponds to the rigidity which may be achieved by conventional mechanical flange nuts. Mechanical flange nuts, however, do not provide means for radially adjusting the tool or even axially aligning a bent mandrel.

Of course, it is possible to omit the conical pressure ring 128 in certain applications. Then the threaded ring 126 is formed such that the elastic radial flange 118 is evenly loaded, thus achieving a relief of the hydraulic rotary piston 124. For example, the elastic ring may be a rubber O-ring.

In order to achieve a good frictional locking between the radial contact surface 118" of the elastic radial flange 118 and the tool 112 it is expedient to load the tool 112 only in a ring-shaped area a. The outer limits 108 of the ring-shaped area a correspond essentially to the outer circumference of the elastic radial flange 118 and the inner limits 109 of which are determined by a given radial distance from the sleeve 116.

Figure 3:
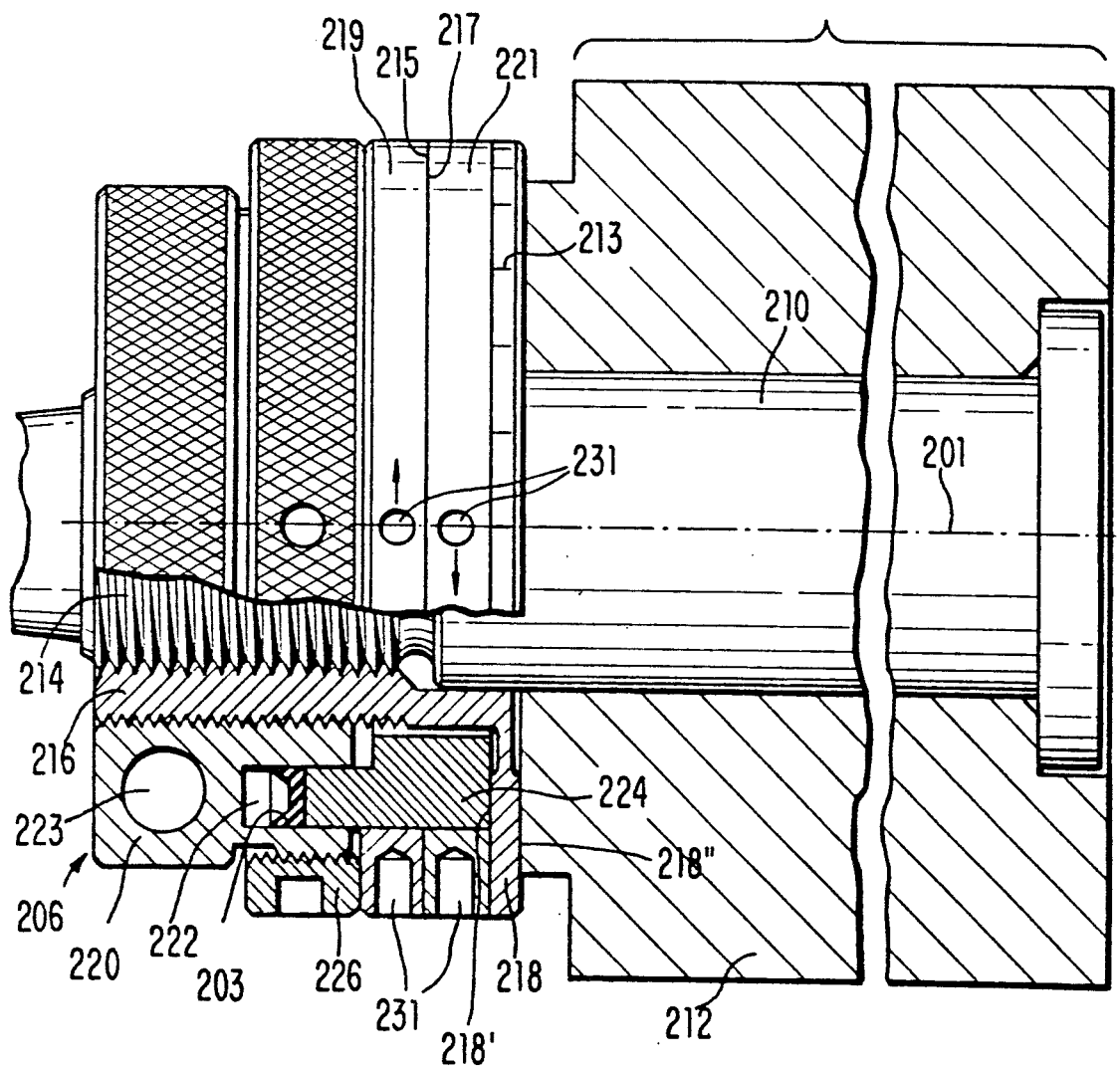
FIG. 3 shows a side view of a third embodiment with a portion represented in a part-sectional view.

In the embodiment according to FIG. 3, a pair of adjusting disks 219, 221, that are rotatable in opposite directions relative to one another, are disposed between the threaded ring 226 and the elastic radial flange 218. The planar faces 215, 217 of the adjustment disks 219, 221, that are facing each other have a predetermined discrepancy from their parallel alignment (non-parallelism) so that the planes are slanted relative to one another. The slanting allows for adjusting an exact desired non-parallelism of the two planes facing away from each other by rotating the disks 219, 212 relative to one another. Since the non-parallelism is only in the range of a few thousands of a millimeter, i.e., in the range of μm, this could not be demonstrated in the drawing. The adjustment disks 219, 212 are equipped with a marked zero position, that is only schematically represented in the drawing, in which the two disks 219, 221 together at every point are of the same thickness and in which the receiving bores 31 are parallel to one another at the outer circumference of the two disks. With the aid of a socket wrench, the disks may be rotated in opposite directions as indicated by the arrows in FIG. 3 so that the disks with the aid of a scale 213, which may be attached to the radial flange 218 (having an abutment surface 218' and a radial contact surface 218"), may be adjusted to the exact desired position. During this rotation of the disks in the opposite direction, an exactly adjustable non-parallelism of the two planar faces that are facing away from each other is created due to the abutting slanted faces 215, 217. A concentricity error which has been measured beforehand may thus be compensated as soon as the threaded ring 226 is fastened and the hydraulic system is partially or entirely relieved.

The present invention is, of course, in no way restricted to the specific disclosure of the specification, examples and drawings, but also encompasses any modifications within the scope of the appended claims.

What we claim is:

1. A hydraulic clamping device for axially clamping bodies of rotation onto a revolving mandrel, said hydraulic clamping device comprising:

a base body disposed on said mandrel;

a rotary piston suspended in a floating manner inside said base body, with said rotary piston being axially slidable relative to said base body via a closed-circuit hydraulic system by pressure elements and thereby tightly clamping said body of rotation in an axial direction; and an elastic element disposed between said base body and said body of rotation, with said elastic element having an abutment surface, perpendicular to an axis of rotation of said clamping device, for contacting said rotary piston and, on a side opposite said abutment surface, having a radial contact surface, perpendicular to said axis of rotation, for pressing against said body of rotation.

2. A clamping device according to claim 1, in which said elastic element is an elastic flange.

3. A clamping device according to claim 2, in which said elastic flange is disposed at a sleeve that is clamped to said mandrel.

4. A clamping device according to claim 3, in which a threaded ring is screwed onto said base body with said threaded ring pressing against said elastic flange such that, after relieving said hydraulic rotary piston, an axial force acting on said body of rotation is maintained.

5. A clamping device according to claim 4, in which, between said threaded ring and said elastic flange, a conical pressure ring is provided which has a radial play, with a face of said conical pressure ring facing said elastic flange that is formed in a conical shape resulting in a wedge-shaped cross-section pointing in a direction of a center axis within said sleeve and with adjustment means being provided for radially adjusting said pressure ring, so that a corresponding displacement of said elastic flange is achievable.

6. A clamping device according to claim 5, in which said threaded ring overlaps said conical pressure ring with a projection that is provided with at least one setscrew which acts on said conical pressure ring for said radial adjustment thereof.

7. A clamping device according to claim 5, in which said conical pressure ring is centered relative to said rotary piston via an elastic ring.

8. A clamping device according to claim 7 in which said elastic ring is an O-ring.

9. A clamping device according to claim 4, in which, between said threaded ring and said elastic flange, a pair of adjusting disks are disposed that are rotatable in opposite directions relative to one another, with planar faces thereof that are facing each other having a predetermined non-parallelism, so that by rotating said adjustment disks relative to one another a desired non-parallelism of planar faces that are facing away from each other is adjustable for the exact compensation of concentricity errors.

10. A clamping device according to claim 9, in which said adjustment disks have a marked scale.

11. A clamping device according to claim 10, in which said marked scale is disposed at said elastic radial flange.

12. A clamping device according to claim 9, in which said adjustment disks, at an outer circumferential rim thereof, have receiving bores for an insertable means for rotating said disks.

13. A clamping device according to claim 3, in which said elastic flange acts on said body of rotation in a ring-shaped area a, with outer limits thereof corresponding essentially to an outer circumference of said elastic flange and with inner limits thereof being at a radial distance from said sleeve.

14. A clamping device according to claim 3, in which said sleeve is screwed onto said base body.

15. A hydraulic clamping device for axially clamping bodies of rotation onto a revolving mandrel, said hydraulic clamping device comprising:

a base body disposed on said mandrel;

a rotary piston suspended in a floating manner inside said base body, with said rotary piston being axially slidable relative to said base body via a closed-circuit hydraulic system by pressure elements and thereby tightly clamping said body of rotation in an axial direction;

an elastic element in the form of an elastic flange disposed between said base body and said body of rotation, with said elastic element being engagable by said rotary piston and abutable against said body of rotation, said elastic flange being disposed at a sleeve that is clamped to said mandrel; and a threaded ring being screwed onto said base body with said threaded ring pressing against said elastic flange such that, after relieving said hydraulic rotary piston, an axial force acting on said body of rotation is maintained.

16. A hydraulic clamping device for axially clamping bodies of rotation onto a revolving mandrel, said hydraulic clamping device comprising:

a base body disposed on said mandrel;

a rotary piston suspended in a floating manner inside said base body, with said rotary piston being axially slidable relative to said base body via a closed-circuit hydraulic system by pressure elements and thereby tightly clamping said body of rotation in an axial direction;

an elastic element in the form of an elastic flange disposed between said base body and said body of rotation, with said elastic element being engagable by said rotary piston and abutable against said body of rotation, said elastic flange being disposed at a sleeve that is clamped to said mandrel; and said elastic flange acting on said body of rotation in a ring-shaped area a, with outer limits thereof corresponding essentially to an outer circumference of said elastic flange and with inner limits thereof being at a radial distance from said sleeve.

17. A hydraulic clamping device for axially clamping bodies of rotation onto a revolving mandrel, said hydraulic clamping device comprising:

a base body disposed on said mandrel;

a rotary piston suspended in a floating manner inside said base body, with said rotary piston being axially slidable relative to said base body via a closed-circuit hydraulic system by pressure elements and thereby tightly clamping said body of rotation in an axial direction; and an elastic element in the form of an elastic flange disposed between said base body and said body of rotation, with said elastic element being engagable by said rotary piston and abuttable against said body of rotation, said elastic flange being disposed at a sleeve that is clamped to said mandrel, with said sleeve being screwed onto said base body.

* * * * *